(No Model.)
A. BURSON.
PRESERVING AND SHIPPING VESSEL.
No. 587,699.  Patented Aug. 10, 1897.
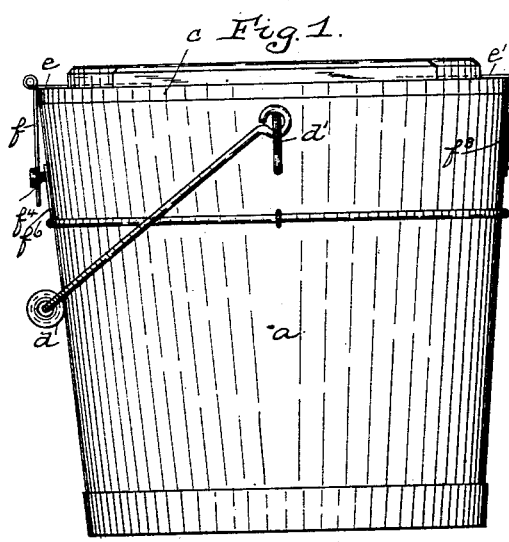
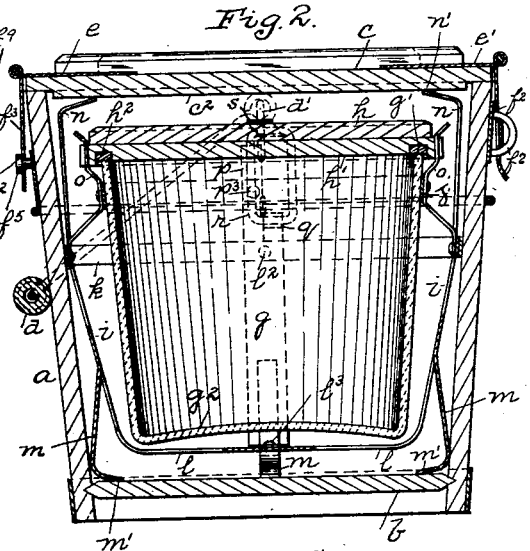
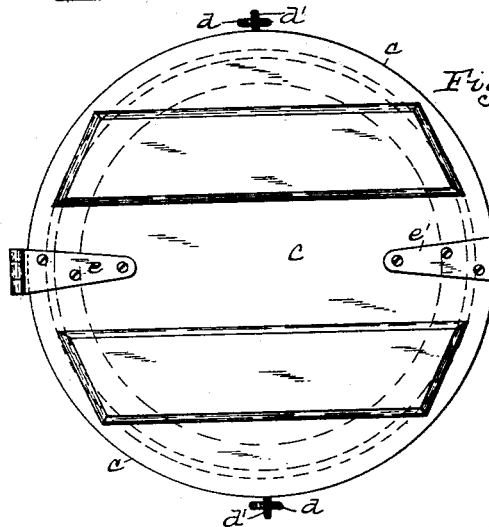
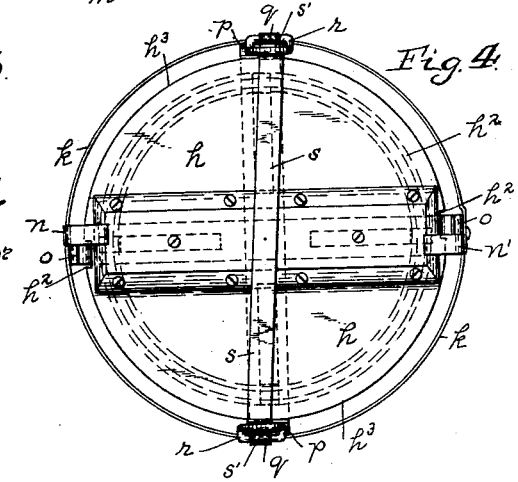
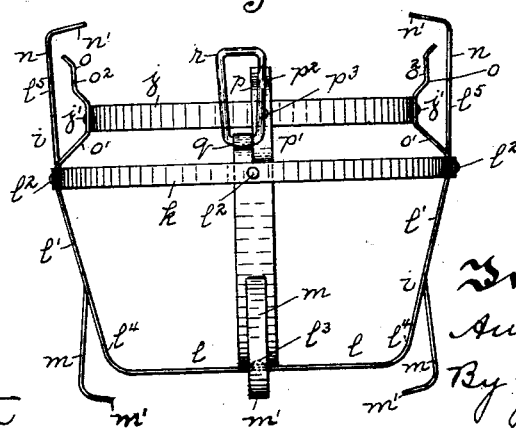
Witnesses:
W. R. Blakely.
J. B. Switzer.
Inventor.
Amos Burson.
By J. N. Cooke
Attorney.

UNITED STATES PATENT OFFICE.

AMOS BURSON, OF NEGLEY, OHIO.

PRESERVING AND SHIPPING VESSEL.

SPECIFICATION forming part of Letters Patent No. 587,699, dated August 10, 1897.

Application filed June 23, 1896. Serial No. 596,577. (No model.)

*To all whom it may concern:*

Be it known that I, AMOS BURSON, a resident of Negley, in the county of Columbiana and State of Ohio, have invented a new and useful Improvement in Preserving and Shipping Vessels; and I do hereby declare the following to be a full, clear, and exact description thereof.

My invention relates to preserving and shipping vessels, and has special reference to vessels for packing and storing butter, &c.

The object of my invention is to provide a butter vessel in which the butter is stored or packed in an air-tight jar, said jar being surrounded and supported in an inclosing case, so as to be relieved of all liability of breaking in handling and transporting from one place to another, while at the same time the jar is readily removable.

Another object of my invention is to provide for the free circulation of air around the jar containing the butter while it is confined within the inclosing case to keep the butter from becoming rancid or impure, thereby overcoming the use of ice or water around the same to keep the butter cool.

My invention consists, generally stated, in the combination of the jar and inclosing case, a metal spring-frame located between the jar and case, said frame having bails thereon crossing under the jar and connected together, and spring-arms depending from said bails and adapted to engage with the case.

It also consists in certain other details of construction and combination of parts, all of which will be more fully hereinafter set forth and claimed.

To enable others skilled in the art to make and use my invention, I will describe the same more fully, referring to the accompanying drawings, in which—

Figure 1 is a side view of my improved preserving and shipping vessel. Fig. 2 is a central section thereof. Fig. 3 is a top view thereof. Fig. 4 is a top view of the jar and frame, and Fig. 5 is a side view of the frame employed.

Like letters herein indicate like parts in each of the figures of the drawings.

As shown in the drawings, $a$ represents the pail or inclosing case, having the bottom $b$ therein and the removable cover or lid $c$ thereon. An ordinary handle or bail $d$ is pivoted on each side of the inclosing case $a$, as at $d'$, for convenience in carrying the vessel. Secured on the top $c'$ of the cover or lid $c$ on the inclosing case $a$ are the straps $e\ e'$, which are provided with the hasps $f f'$, depending therefrom and having the elongated openings or slots $f^2$ therein, the slots $f^2$ in the hasp $f$ having an enlargement $f^3$ therein, which is adapted to engage with a pin $f^4$, provided with a head $f^5$, rigidly secured on the side of the inclosing case $a$, as at $f^6$. The other slot $f^2$ in the hasp $f'$ is adapted to engage or slip over the staple $f^7$, rigidly secured to the side of the inclosing case $a$, as at $f^8$, and be held therein by a pin or strap $f^9$.

The jar $g$ is adapted to be inserted within the inclosing case $a$ and has the removable cover or lid $h$ thereon. The jar $g$ is generally formed of glass, while the cover or lid $h$ is generally formed of wood, and in order to form the jar $g$ air-tight a rubber gasket $h^2$ is countersunk into the bottom face $h'$ of the lid $h$ and presses against the top $g'$ of the jar $g$ when packed.

The jar $g$ is supported within the inclosing case $a$ by means of the metal frame $i$, which is secured around the jar $g$, between the jar $g$ and inclosing case $a$. This metal frame $i$ is preferably made in a skeleton form out of common hoop-iron, so as to have sufficient resiliency when secured in place within the inclosing case $a$, and has the concentric ring $j$, which is adapted to fit around the jar $g$ near the top edge $g'$ thereof. Another concentric ring $k$ is secured within and formed as part of the frame $i$ below the concentric ring $j$, the ring $k$ having the uprights $l'$ of the bails $l$ secured thereto by the rivets $l^2$. These bails $l$ are preferably four in number and cross each other with their doubled ends under the bottom $g^2$ of the jar $g$ at right angles to each other and are secured at their centers by the rivet $l^3$. Cut or stamped out of the legs $l^4$ of the bails $l$ and depending outwardly therefrom are the lower spring-arms $m$, which are, if desired, adapted to engage with the interior of the inclosing case $a$. The lower spring-arms $m$ are provided with the inwardly-bent ends $m'$, which are adapted to rest upon the bottom $b$ of the inclosing case $a$. Above the ring $k$ the upright portions $l^5$ of the legs $l^4$ of the bails $l$ are split or cut at or about their centers in a vertical plane, which form the upper spring-arms $n$ and the guides $o$ opposite to each other, as well as the supports $p$ and bearings $q$ opposite to each other, at right angles to the upper spring-arms $n$ and guides $o$. The upper spring-arms $n$ are provided with the inwardly-bent ends $n'$, which are adapted to come in contact with the bottom $c^2$ of the lid $c$ on the inclosing case $a$ when the lid $c$ is in place or when the vessel is turned upside down. The guides $o$ adjacent to the spring-arms $n$ are bent inwardly, as at $o'$, and are secured to the ring $j$ by means of the rivets $j'$, and they are also bent outwardly, as at $o^2$, to fit within the seats $h^2$ in the lid $h$ to guide the same to place on the jar $g$. The supports $p$, at right angles to the guides $o$, are bent inwardly, as at $p'$, and outwardly, as at $p^2$, and rest against the outer face or edge $h^3$ of the lid $h$ when in place. These supports are secured to the ring $j$ by rivets $p^3$. The bearings $q$ adjacent to the supports $p$ have the loops $r$ secured therein, and in order to secure the lid $h$ in place on the jar $g$ a spring-bar $s$ extends across the lid $h$ and is provided with spring-lips $s'$ at each end thereof for engaging with the loops $r$ on the frame $i$.

These preserving and shipping vessels are generally filled with butter in cellars or other cool places, so that the air contained around the jar $g$ within the inclosing case $a$ shall be pure and cool, and when it is desired to pack the vessel, after the butter has been placed within the jar $g$, the jar $g$ is placed within the metal frame $i$, which has previously been made in any suitable manner around a mandrel or form. After this is done the lid $h$ is placed upon the jar $g$, being guided to place by means of the guides $o$ on the frame $i$ and held in place by said guides $o$ and the supports $p$. Then the spring-bar $s$ is placed across the top of the lid $h$, with one of its spring-lips $s'$ fitting under one of the loops $r$ on the frame $i$, after which the other spring-lip $s'$ on the bar $s$ can be sprung under the other loop $r$, so securing the lid $h$ against the top $g'$ of the jar $g$, with the said edge $g'$ pressing against the rubber gasket $h^2$ in the bottom $h'$ of the lid $h$, so rendering the jar $g$ air-tight. The jar $g$ and metal frame $i$ are now ready for insertion into the inclosing case $a$, which can be done by simply dropping the jar $g$ and metal frame $i$ within the inclosing frame $a$, which allows the ring $k$ to come in contact with the inside or interior walls of the inclosing case $a$, as well as the lower spring-arms $m$, which also have their bent ends $m'$ resting upon the bottom $b$ of the case $a$. The lid $c$ is then placed upon the inclosing case $a$ by means of the enlargement $f^3$ in the hasp $f$ passing over the head $f^5$ on the pin $f^4$, the said pin $f^4$ seating itself in the slot $f^2$, after which the lid $c$ can be held down and in place by the hasp $f'$ slipping over the staple $f^7$, through the slot $f^2$, and be secured therein by the strap $f^9$, passing through the staple $f^7$, so allowing the bottom of the lid $c$ to rest upon the bent ends $n'$ of the upper spring-arms $n$ and rendering the inclosing case $a$ air-tight.

It will thus be seen that by my improved preserving and shipping vessel all liability of the butter becoming rancid or impure is overcome. The vessel having a dry-air space around and within it overcomes all liability of the butter becoming rancid by atmospheric electricity while being stored during the summer seasons, as is the case where ice and water is used, the vessel acting as a refrigerator. An even temperature is always maintained around the jar within the inclosing case, and, being free from fabrics and cloths, free circulation of air is obtained, which prevents obnoxious smells and odors from within the case affecting the butter.

The vessel can be easily packed and unpacked, and all danger of breaking the jar or displacing the same is overcome, as the devices for holding the jar in place prevent the same from moving to either side or up and down within the inclosing case and always hold it in a central and steady position.

The vessel does not require the use of ice or water, can easily be shipped from place to place without the least danger of the butter becoming impure or the case injured, and any jars and knocks upon the case will not affect the jar or move the same out of place on account of the springy nature of the metal frame within the case.

Various modifications in the construction and position of the various parts of the apparatus may be resorted to without departing from the spirit of the invention or sacrificing any of its advantages.

What I claim as my invention, and desire to secure by Letters Patent, is—

1. The combination of the jar and inclosing case, a spring-metal frame located between the jar and case, said frame having bails thereon crossing under the jar and connected together, and spring-arms depending from said bails and adapted to engage with the case, substantially as described.

2. The combination of the jar and inclosing case, a spring-metal frame located between the jar and case, said frame having bails thereon crossing under the jar and connected together, and spring-arms depending from said bails and adapted to engage with the bottom of the case, substantially as described.

3. The combination of the jar and inclosing case, a spring-metal frame located between the jar and case, said frame having bails thereon crossing under the jar and connected together, and spring-arms depending from said bails and adapted to engage with the sides of the case, substantially as described.

4. The combination of the jar and inclosing case, a spring-metal frame located between the jar and case, said frame having bails thereon crossing under the jar and connected together, and spring-arms depending from said bails and adapted to engage with the bottom and sides of the case, substantially as described.

5. The combination of the jar and case, a spring-metal frame located between the jar and case, said frame having bails thereon crossing under the jar and connected together, spring-arms depending from said bails and adapted to engage with the case, and a ring on said frame adapted to engage with the sides of the case, substantially as described.

6. The combination of the jar and inclosing case, a spring-metal frame located between the jar and case, said frame having bails thereon crossing under the jar and connected together, spring-arms depending from said bails and adapted to engage with the case, a ring on said frame adapted to engage with the sides of the case, and a ring on said frame adapted to engage with the exterior surface of the jar, substantially as described.

7. The combination of the jar and an inclosing case having a lid or cover thereon, a spring-metal frame located between the jar and the case, said frame having bails thereon crossing under the jar and connected together, spring-arms depending from said bails and adapted to engage with the case, a ring on said frame adapted to engage with the sides of the case, a ring on said frame adapted to engage with the exterior surface of the jar, and spring-arms on said frame adapted to engage with the bottom of said lid or cover, substantially as described.

8. The combination of the jar having a lid or cover thereon and an inclosing case having a lid or cover thereon, a spring-metal frame located between the jar and case, said frame having bails thereon crossing under the jar and connected together, spring-arms depending from said bails and adapted to engage with the case, a ring on said frame adapted to engage with the sides of the case, a ring on said frame adapted to engage with the exterior surface of the jar, spring-arms on said frame adapted to engage with the bottom of the lid or cover on the case, and spring-arms on said frame adapted to engage with the lid or cover on the jar, substantially as described.

9. The combination of the jar having a lid or cover thereon and an inclosing case having a lid or cover thereon, a spring-metal frame located between the jar and case, said frame having bails thereon crossing under the jar and connected together, spring-arms depending from said bails and adapted to engage with the case, a ring on said frame adapted to engage with the sides of the case, a ring on said frame adapted to engage with the exterior surface of the jar, spring-arms on said frame adapted to engage with the lid or cover on the case, spring-arms on said frame adapted to engage with the lid or cover on the jar, and supporting-arms on said frame adapted to engage with the lid or cover on the jar, substantially as described.

10. The combination with the jar having a lid or cover thereon and an inclosing case having a lid or cover thereon, a spring-metal frame located between the jar and case having bails thereon crossing under the jar and connected together, spring-arms depending from said bails and engaging with the case, a ring on said frame engaging with the sides of the case, a ring on said frame engaging with the jar, spring-arms on said frame engaging with the bottom of the lid or cover on the case, spring-arms on said frame engaging with the lid or cover on the jar, supporting-arms on said frame engaging with the lid on the jar, and loops on said frame adapted to engage with a spring-bar on and above the lid on the jar, substantially as described.

11. A spring-metal frame composed of two concentric rings connected together, bails secured to said rings, crossing each other and connected together, and spring-arms depending from said bails, substantially as described.

12. A spring-metal frame composed of two concentric rings connected together, bails secured to said rings, crossing each other and connected together, and spring-arms depending from said bails having inwardly-bent ends, substantially as described.

13. A spring-metal frame composed of two concentric rings connected together, bails secured to said rings, crossing each other and connected together, spring-arms depending from said bails having inwardly-bent ends, and spring-arms above said bails and rings, substantially as described.

14. A spring-metal frame composed of two concentric rings connected together, bails secured to said rings, crossing each other and connected together, spring-arms depending from said bails having inwardly-bent ends, spring-arms above said bails and rings, and guide-arms above said rings, substantially as described.

15. A spring-metal frame composed of two concentric rings connected together, bails secured to said rings, crossing each other and connected together, spring-arms depending from said bails having inwardly-bent ends, spring-arms above said bails and rings, guide-arms above said rings, and supports above said rings, substantially as described.

16. A spring-metal frame composed of two concentric rings connected together, bails secured to said rings, crossing each other and connected together, spring-arms depending from said bails having inwardly-bent ends, spring-arms above said rings and bails, guide-arms above said rings, supports above said rings, and loops forming bearings above said rings, substantially as described.

17. A spring-metal frame composed of two concentric rings connected together one above the other, the upper ring being of less diameter than the lower, a series of bails secured to the lower ring, crossing at their lower end and connected together, a series of spring-arms having inwardly-bent ends depending from said bails, spring-arms above said bails, guide-arms adjacent to said upper spring-arms and secured to the upper ring, supports at right angles to the guide-arms and secured to the upper ring, and bearings adjacent to said supports having loops therein, substantially as described.

In testimony whereof I, the said AMOS BURSON, have hereunto set my hand.

AMOS BURSON.

Witnesses:
T. J. RICHARDSON,
SAML. L. FISHER.